Figures 1, 2:
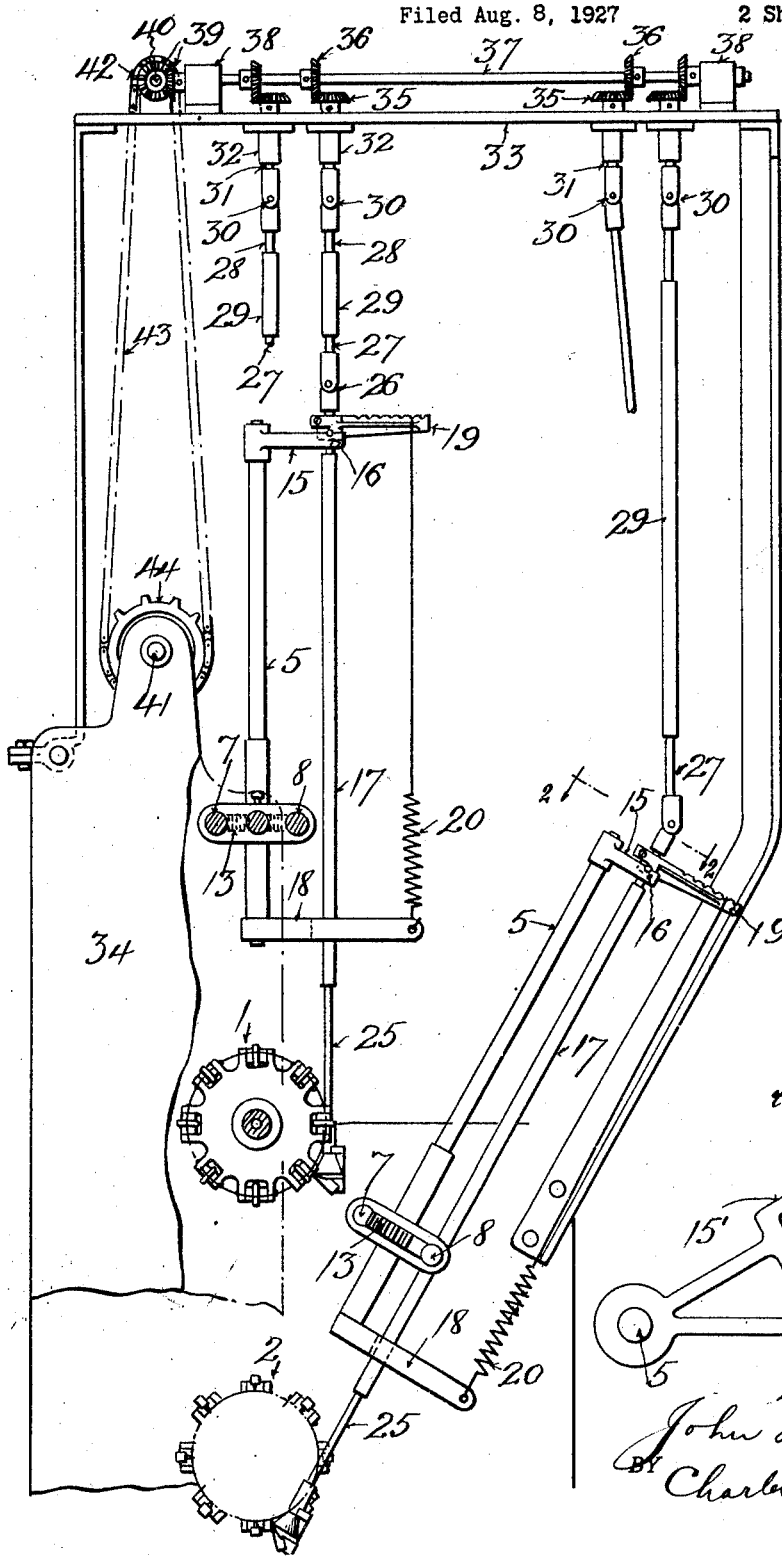

Oct. 22, 1929.　　　J. F. KOHLER　　　1,732,757

NUT PARING MACHINE

Filed Aug. 8, 1927　　　2 Sheets-Sheet 1

INVENTOR
John F. Kohler
BY Charles G. Hensley
ATTORNEY

Oct. 22, 1929.  J. F. KOHLER  1,732,757
NUT PARING MACHINE
Filed Aug. 8, 1927  2 Sheets-Sheet 2
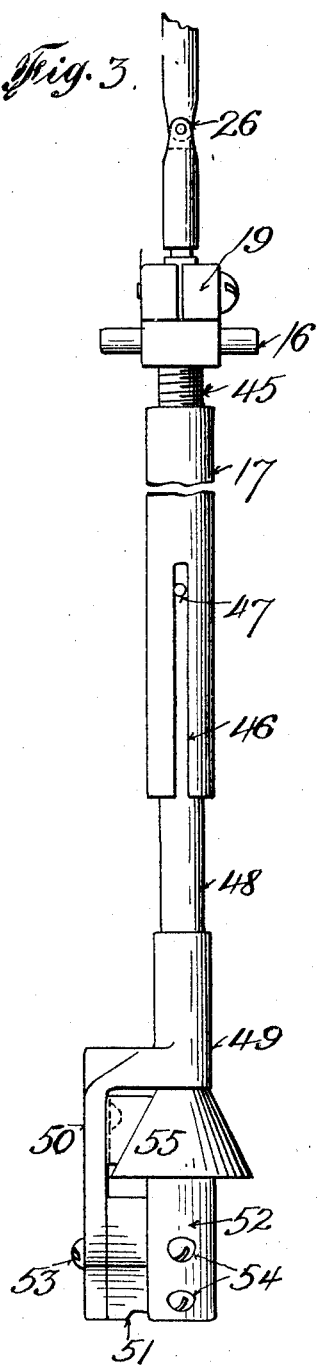
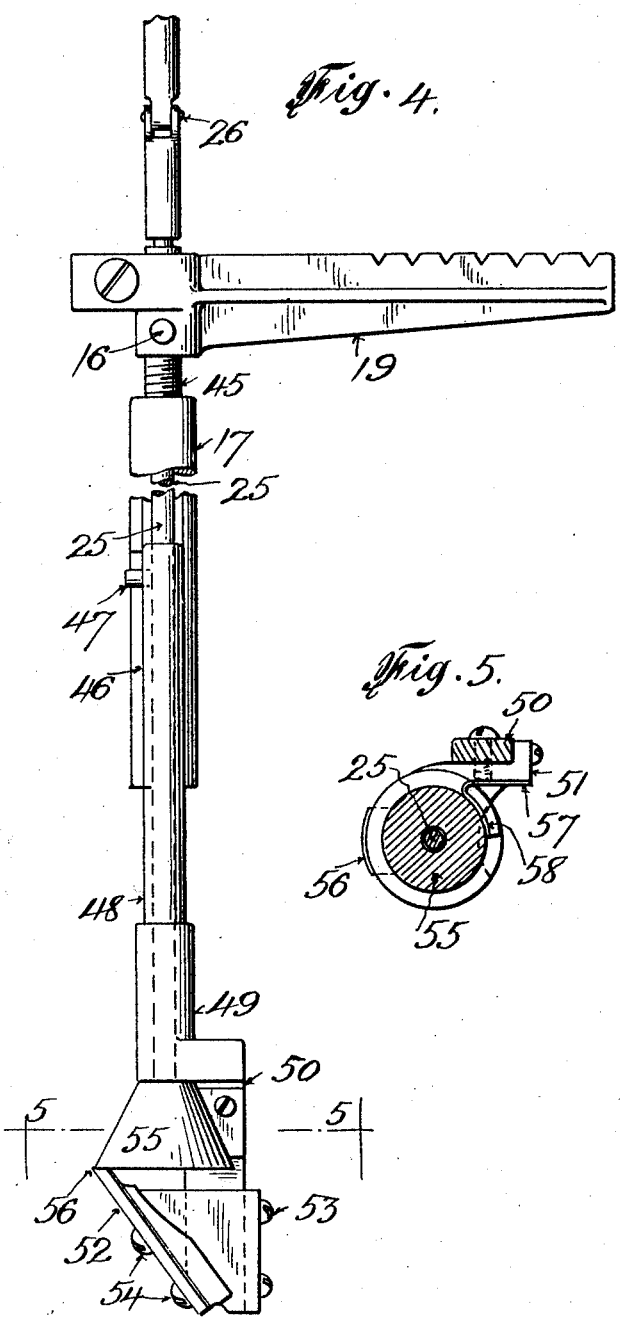

Patented Oct. 22, 1929

1,732,757

UNITED STATES PATENT OFFICE

JOHN F. KOHLER, OF WHITE PLAINS, NEW YORK

NUT-PARING MACHINE

Application filed August 8, 1927. Serial No. 211,323.

The following U. S. patents were issued to me for machines for paring nuts: 1,445,144, 1,445,145, 1,445,146 and 1,445,147, all dated February 13th, 1923, and Patent 1,545,106 dated July 7th, 1925. The present invention is adapted to be used in conjunction with the machines and devices shown in those patents, and cross reference may be made to them for an understanding of such parts of the complete machine as are omitted from the present case; although it will be understood that the present invention is not necessarily limited to use in a machine constructed according to those patents.

In paring nuts, especially cocoanuts, for the purpose of removing the thin brown skin on the exterior of the kernel, it is desirable that the paring be cut as thin as possible in order to reduce the waste of meat to the minimum, and while the devices shown in the aforesaid patents have successfully pared this brown skin from the nuts automatically, there has been some difficulty in keeping the parings clear of the cutting edge of the knife, and the principal object of the present invention is to provide mechanically operated means for continually clearing the knife of the parings, so that a fresh clean edge is always acting upon the nut. This branch of the invention involves a revolving member associated with the knife and operated mechanically while the knife is in action, so that the revolvable member not only serves as a guard or gauge to limit the depth of cut, but it also serves to remove the parings from the knife edge. Another object of my invention is to provide a curved paring knife and associated therewith a guard for limiting the depth of cut. This feature, in the more specific form also includes a frustro conical guard which will permit the knife to cut at the desired angle in relation to the nut and in the full embodiment of my invention this frustro conical guard is also the revolvable member which serves to clear the parings from the knife.

In the drawings forming part of this application,

Figure 1 is a side elevation of the portion of the machine containing the features of my present invention, Figure 2 is a sectional view taken on the line 2—2 of Figure 1, Figure 3 is an elevation of the knife holder and the parts carried thereby, Figure 4 is a similar view taken at right angles to that of Figure 3, and Figure 5 is a sectional view taken on the line 5—5 of Figure 4.

As previously stated, I have chosen to illustrate my invention applied to a machine such as is shown in my said Letters Patent. In Figure 1 I have shown at 1 one of the holders for holding and revolving a cocoanut kernel and at 2 I have shown another holder for gripping and holding, as well as for revolving the nut after one-half of its surface has been pared when previously held by the holder 1. As shown in my said patents, these grippers engage the nut first from one end to leave one-half of the nut exposed to the operation of the cutting knife, and after one-half of the nut has been pared from the equatorial line to one apex, the nut is transferred endwise from the first gripper to the second gripper, which latter grasps the portion of the nut which was previously pared, and revolves the nut while a second set of knives pare from the equatorial line to the apex opposite to that previously acted upon by the first set of knives. These patents also show a method of having two knives for each half of the nut, operating in sequence in position simultaneously upon one half of the nut and the present showing of my invention incorporates this feature, although the present invention may be used regardless of whether one or more knives operate on each half of the nut.

The several knife holders or swinging supports are constructed in the same way so that a description of one will apply to all of them. In the drawings I have shown a shaft 5 which corresponds with the shaft 5 of my Patent No. 1,545,106. This shaft is adapted to be operated in the same manner as the corresponding shaft in said patent. The rods 7 and 8 and the gear 13 correspond with the similarly lettered parts in said patent. There is an arm 18 connected with the lower end of the shaft 5 and this arm is attached to the lower end of the sleeve 17. The upper end of the shaft 5 is provided with a forked arm 15 which reaches over the upper end of the sleeve 17 and it forms a bearing for the pins 16 which are fixed to the arm 19. On the upper end of the member 45 there is attached an arm 19 having recesses to receive the upper end of the coiled spring 20 which latter has its opposite end attached to the free end of the arm 18. The latter is forked and straddles and guides the lower end of the sleeve 17. This upper arm 19 is the member which carries the pivot pins 16 that rest in the socket in the arm 15. The tension of the spring 20 between the forked arm 18, which is rigid on the lower end of the shaft 5, pulls down on the free end of the arm 19 and this tends to rock the sleeve 17 to the left in Figure 1 for the purpose of holding the paring knife in close contact with the periphery of the nut which is being revolved in either the holder 1 or the holder 2. There is a shaft 25 extending axially through the sleeve 17 and on its upper end it is connected by means of the universal coupling 26 with a short shaft 27 and this latter shaft is composed of telescoping parts which allow it to extend and contract in the direction of its length to compensate for the arcuate movement at the upper end of the shaft 25, since the latter shaft partakes of the swinging motion of the sleeve 17. For this purpose the extensible shaft may consist of the two end sections 27, 28 which slide within an outer sleeve 29 the several parts being connected by feathers so that all parts of this extensible shaft will revolve together and at the same time permit the end sections to telescope or slide within the sleeve. The upper member 28 of this extensible shaft is connected by a pivotal joint 30 with the short shaft 31 extending through the hub 32 which is mounted upon a supporting bracket 33 in the upper part of the machine, this bracket being secured to the frame structure 34 of the machine. On the upper end of the short shaft 31 there is a mitre gear 35 which meshes with and is driven by a similar mitre gear 36 arranged on the horizontal shaft 37 which is journaled in the bearing members 38 both of which are mounted on the upper bracket 33. The longitudinal shaft 37 is driven by means of a pair of mitre gears 39 from a stub shaft 40 also supported on the bracket 33; and this shaft is operated from a shaft 41 which is part of the drive of the paring machine, by means of a sprocket 42 on the stub shaft, and a sprocket 44, through the action of the chain 43 which engages over both of these sprockets.

Where two paring knives are employed for paring one-half of the nut while in the holder 1 the parts above described will be duplicated from the horizontal shaft 37 down to the cutting knife. In Figure 1 I have indicated the relation of these two sets of devices. I have also indicated two sets of devices similar in construction for operating on the exposed half of the nut which is revolved by the holder 2 in the lower position. This relative arrangement of the paring devices corresponds with the arrangement shown in my Patent No. 1,545,106 and except for the differences herein pointed out the paring devices operate in the same relation as the paring devices in said patent. The upper arm 15 for supporting the swinging sleeve and shaft is duplicated to provide an arm 15' shown in Figure 2, and this arm supports the companion sleeve shaft 5 and the paring elements arranged at the bottom of this shaft. This construction is the same for both sets of devices shown in Figure 1.

As shown more clearly in Figures 3 and 4 the upper end of the sleeve 17 is reduced in diameter and is provided with the thread 45 which screws into a hub of the arm 19 and by revolving this sleeve the distance between the pivotal arm 19 and the paring knife may be adjusted to bring the cutting edge of the knife into correct relation to the nut, either in the holder 1 or in the holder 2, as the case may be. The bottom end of this sleeve 17 is provided with a slot 46 to receive a pin 47 which projects from a second sleeve 48 which is slidable vertically within the bore of the sleeve 17. This removable sleeve 48 has mounted upon its lower end a casting 49 which forms a holder for the cutting blade and for the scraper which removes the parings from the revolvable guard. For this purpose the casting 49 has an offset arm 50 extending downwardly and to this is attached a block 51 for holding the knife blade. This block is provided with a curved seat arranged at an angle to the axis of the sleeve 48 and against this surface is attached the knife blade 52 which is here shown as of arcuate shape in cross section. Preferably, this knife blade is formed on the arc of a circle with its upper cutting edge ground to lie parallel with the lower end of the guard member. It may be stated that the screws 53 attach the knife block to the arm 50 and the screws 54 attach the knife blade to the knife block. The shaft 25 extends through the bore of the upper sleeve 17 and it also extends through the bore of the detachable sleeve 48 and on its lower end where it projects through the casting 49 there is secured the revolvable knife guard 55. In the preferred construction shown in the drawings, this guard is of frustro conical shape with its wider end lying close to but slightly below the cutting edge 56 of the knife, the distance which these two members overlap being very slight where a very thin paring is to be taken. The guard does not touch the knife blade but is slightly spaced therefrom sufficiently to allow the paring to clear between the cutting edge and the guard. There is also attached to the arm 50 a plate 57 which carries a scraping shoe 58 shaped to conform to and rest against the periphery of the frustro conical guard 55.

*Operation*

It will be noted that the revolvable guard has its lower edge lying adjacent to and concentric with the cutting edge of the knife, and the periphery of this guard is disposed at an obtuse angle with relation to the plane of the knife as is shown in Figure 4. This relation of the movable guard and knife provides clearance for the knife in acting on the many irregular surfaces presented by the various nuts. When the device is in operation the nuts are revolved first in the holder 1 and afterwards it is transferred to the holder 2 so that after the machine has been in operation for a brief period one of these holders will be revolving a nut which has been freshly fed to it, whereas the other will be revolving a nut which has been half pared during the period it was in the first holder, all of which is set forth in connection with the machines shown in my said patents. The operation of the paring machine causes the shaft 41 to be revolved and the motion is transmitted by means of the sprockets 42, 44 and chain 43 to the shaft 37. From this shaft the revolvable motion is imparted by means of the various mitre gears 36, 35 to the telescoping shafts 27, and from these the motion is transmitted to the vertical shafts 25 which latter are adapted to be rocked with the sleeve 17 under the action of the coiled spring 20, drawing down on the lever arm 19, for the purpose of keeping the knife blade in continual contact with the periphery of the nut. The pivotal action of the shaft 25 is permitted by the pivotal connections 26, 30 and by the telescoping action of the shaft 27 without interfering with the transmission of the revolving motion from the horizontal shaft 37 to the several vertical shafts 25. At the beginning of the paring action the shaft 5 is rotated by the same mechanism as described in my said Letters Patent, so that the arms 15, 18 describe an arc about the shaft 5 and the latter also advances laterally a distance corresponding with the traverse of each paring knife in relation to the nut. If one knife is to pare one-half of the nut, as shown in Patent No. 1,445,146, then the shaft 5 will travel laterally approximately one-half the length of the cocoanut, but where a pair of knives is to simultaneously operate on the same half of the nut in the manner shown in Patent No. 1,545,106, then the shaft 5 will move laterally a distance corresponding substantially with one-fourth the length of the average cocoanut. In other words, the present device does not alter the relationship of the knives in their traverse of the cocoanut over that shown in my previous patents. The curved edge of the knife blade acts upon the cocoanut which is revolved in the holder, removing a paring comprising principally the thin brown skin, and if the knife blade is adjusted to provide a very small clearance between the cutting edge and the lower edge of the guard member 55, the paring may be made so thin that there will be very little meat removed with it. In practice it has been possible to remove parings which are very much thinner than the parings removed by hand paring, thus reducing the waste of meat in addition to the saving in labor. While the knife blade is acting on the nut, the guard 55 is being continuously revolved, so that the parings which pass between the knife blade and guard or over the guard, and which, because of the slight clearance between these members and the moisture in the parings, have a tendency to clog or hang, are carried away from the point of cutting by the revolvable guard; and if any of the paring follows the guard around, it is removed by the scraper 58, so that a clean portion of guard is continuously presented to the cutting edge of the knife. If the parts are accurately made, the spacing of the guard and knife is not altered by the revolving motion of the former, so that the cutting action is approximately as accurate as if a stationary guard were used. With the guard made frustro conical shape, as shown in the drawings, and a knife blade which is arcuate in cross section, the guard will not hold the knife edge away from the periphery of the nut regardless of the various peculiar irregularities of its surface. Furthermore, the overlapping of the guard and knife may be comparatively slight, as shown in the drawings, so that the parings may pass freely between the guard and knife, or they may be even carried laterally away from the point of cutting by the revolvable guard. In either event the parings are prevented from packing between the knife and the guard by the revolving action of the latter, so that it is not necessary at any time to stop the machine for the purpose of removing the parings.

Having described my invention, what I claim is:

1. In a machine for paring nuts, the combination of means for holding a nut, a knife having a curved edge for paring the nut, a revolvable guard to limit the depth of cut of the knife, and means for revolving said guard in relation to the knife while the knife is in operation.

2. In a machine for paring nuts the combination of means for holding a nut, a non-revolvable knife for paring the nut, a revolvable guard to limit the depth of cut of the knife and means for revolving the guard in relation to the knife while the latter is in operation.

3. In a machine for paring nuts the combination of means for holding the nut, a nonrevolvable knife of arcuate shape in cross section, an arcuate guard co-operating with said knife to limit the depth of cut, and means for revolving the guard in relation to the knife while the latter is in operation.

4. In a machine for paring nuts the combination of means for holding the nut, a nonrevolvable knife of arcuate cross section, a frustro conical guard co-operating with said knife to limit the depth of cut, said guard being disposed with its larger end adjacent and parallel to the arcuate cutting edge of the knife and means for revolving said guard in relation to the knife while the latter is in operation.

5. In a machine for paring nuts the combination of means for holding a nut, a knife for paring the nut, said knife being nonrevolvable and arcuate in cross section, a frustro conical guard co-operating with said knife to limit the depth of cut, said guard being disposed with its larger end parallel to the arcuate cutting edge of the knife and spaced from the convex side of said edge, and means for revolving said guard in relation to the knife while the latter is in operation.

6. In a machine for paring nuts the combination of means for holding a nut, a nonrevolvable knife for paring the nut, said knife being arcuate in cross section, a frustro conical guard co-operating with the knife to limit the depth of cut, said guard being disposed with its larger end arranged adjacent and parallel to the arcuate cutting edge of said knife and spaced from the convex side thereof, said knife overlapping the larger end of said guard, and means for revolving said guard in relation to the knife while the latter is in operation.

Signed the 12th day of July, 1927, at the city, county, and State of New York.

JOHN F. KOHLER.